Figure 1:
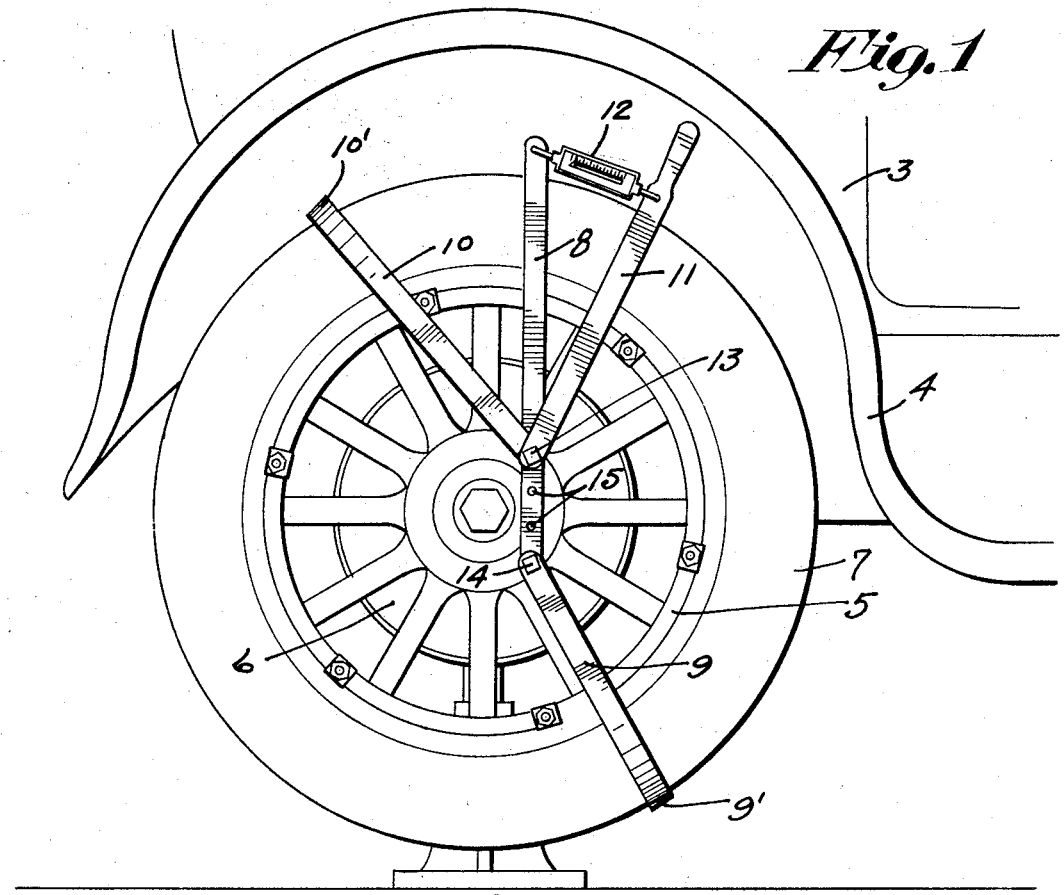

June 23, 1925.  1,542,962

J. J. RODEN ET AL

AUTO BRAKE TESTING DEVICE

Filed March 5, 1924

Inventors
John J. Roden
Paul W. Quinn
David C. Roden
By their Attorneys

Patented June 23, 1925.

1,542,962

UNITED STATES PATENT OFFICE.

JOHN J. RODEN AND PAUL W. QUINN, OF MINNEAPOLIS, AND DAVID C. RODEN, OF ST. PAUL, MINNESOTA.

AUTO BRAKE-TESTING DEVICE.

Application filed March 5, 1924. Serial No. 697,067.

*To all whom it may concern:*

Be it known that we, JOHN J. RODEN, PAUL W. QUINN, and DAVID C. RODEN, citizens of the United States, residing, respectively, at Minneapolis, Minneapolis, and St. Paul, in the counties of Hennepin and Ramsey and State of Minnesota, have invented certain new and useful Improvements in Auto Brake-Testing Devices; and we do hereby declare the following to be a full, clear, and exact description of the invention, such as will enable others skilled in the art to which it appertains to make and use the same.

Our invention provides an extremely simple and highly efficient device for testing the friction under which automobile brakes and the like are set, and, generally stated, the invention consists of the novel devices and combinations of devices hereinafter described and defined in the claims.

It is a well known fact that it is highly important that the brakes of the rear traction wheels of an automobile or other motor-propelled vehicle be adjusted so that they will set for the same frictional braking action. This relative setting of the brakes is highly important in the ordinary two-wheel brake systems, but becomes of even greater importance in four-wheel brake systems. In four-wheel brake systems, it is of the utmost importance that the front wheel brakes never be set with greater force than the rear wheel brakes and, generally, the front wheel brakes should be set under slightly less friction than the rear wheel brakes. At any rate, in any brake system, there is the proper relative setting of the brakes, which should be maintained for the best braking action and for greatest safety. Hitherto, it has been the common practice to set the brakes and then to test the brakes in the different wheels by manual rotation, relying upon the judgment of the operator to estimate the frictional braking action, but such estimates are always inaccurate and never reliable.

Our invention provides an extremely simple device which may be quickly applied and used and which will indicate exactly, in pounds or in fractions thereof, the frictional action under which the brakes are set.

A simple form of our improved brake-testing device is illustrated in the accompanying drawings, wherein like characters indicate like parts throughout the several views.

Figure 2:
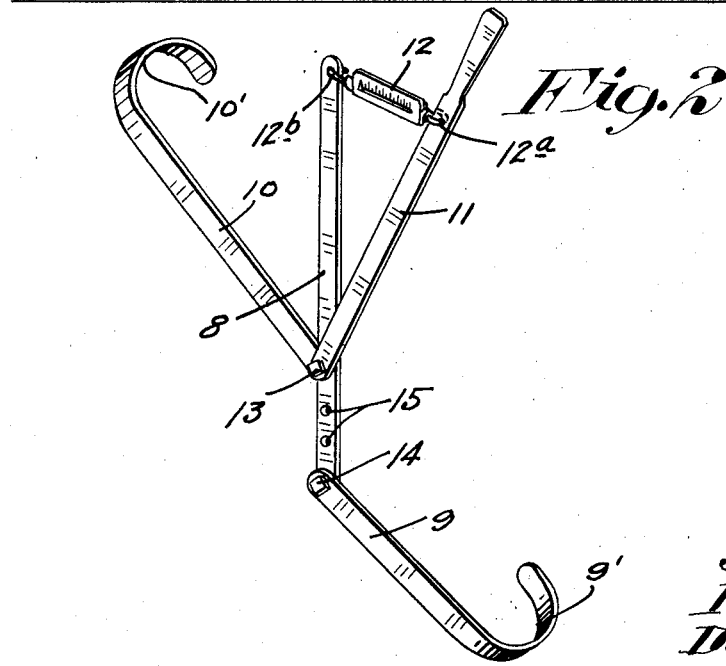

Referring to the drawings;

Fig. 1 is a side elevation diagrammatically showing a portion of an automobile and showing our improved brake-testing device applied through one of the rear traction wheels thereof; and Fig. 2 is a perspective showing the brake-testing device removed from the wheel.

Of the parts of the automobile, it is only desirable for the purposes of this case to particularly note the body 3, rear fender 4, wheel 5, brake drum 6, and tire 7.

The brake-testing device in the form illustrated comprises four bars or metallic straps 8, 9, 10, and 11, and a spring scale 12. The bars 10 and 11 are pivotally connected to the intermediate portion of the bar 8 by a bolt or stud 13. The bar 9 is pivotally connected to the lower portion of the bar 8 by a nut-equipped bolt 14, which, as shown, is adapted to be passed through any one of several longitudinally spaced perforations 15 in said bar 8. The bars 9 and 10, at their free ends, are curved, respectively, at 9′ and 10′, so as to form hooks that are adapted to embrace and engage the exterior of the tire 7. The bar 8 operates as a primary lever and the bar 11 as a secondary lever. The spring scale 12, at its ends, is provided with the customary hooks 12ª and 12ᵇ, one of which is fixed to the scale frame and the other of which moves with the scale pointer. As shown, the hook 12ª is hooked through a perforation in the secondary 11, and the hook 12ᵇ is hooked through a perforation in the upper end of the primary lever 8.

In applying the brake tester to a wheel, the hooked ends 9′ and 10′ of the bars 9 and 10 will preferably be applied on the tires at approximately diametrically opposite points or as shown in Fig. 1, and here it is important to note that the bar 9 is considerably shorter than the bar 10, so that when applied as just stated, the primary lever 8 will stand at one side of the hub of the wheel. When the device is thus applied and the secondary lever 11 is moved toward the right in respect to Fig. 1, the initial tension put on the spring scale 12 will draw the primary lever 8 in the same direction, and this, as is evident, causes the hooks 9' and 10' to grip the tire with a force that increases as the force or pull on the lever 11 is increased. As the lever 11 is pulled as stated, the scale 12 will begin to indicate in pounds and fractions thereof the amount of the pull put on the lever 11, and the operator, by observing the indication on the scale at the time that the wheel starts to move or to slip its brake drum, may quickly determine the force in pounds required to move that particular wheel.

In using this device to determine the relative setting of the several brake-equipped wheels of a car, the brake pedal should be forced to a brake-setting position and there held in a predetermined brake-setting position by some suitable device. When this is done, and the several brake-equipped wheels are tested as above described, it may be accurately determined whether or not the brakes are properly set, and if they are not, then the brakes of the different wheels can be independently adjusted until they are set for the proper relative braking actions. It is not necessary that the brakes be set under great pressure in order to accomplish the testing of the relative setting thereof on the plan above described. The brakes, being once set for the proper relative tension under any certain pressure from the brake pedal, will have the same relation for all brake-setting actions.

This device, while extremely simple and of small cost, is very efficient for the purposes had in view. Not only can it be easily applied and clamped to the wheel by the simple operation of the secondary brake lever, but it will automatically adjust itself to wheels varying considerably in diameter. If the wheels for different cars vary greatly in diameter, it may sometimes be necessary to change the adjustment of the pivot bolt 14 in the holes 15, but for use on the same car, readjustments are never necessary. moreover, the device described is easily reversible, so that it may be readily used on either side of the machine. Obviously, to reverse the device, the bars 9 and 10 and the secondary lever 11 will be moved to positions on opposite sides of the primary lever 8 from those positions indicated in Fig. 1. To permit the lever 11 to move to the opposite side of the lever 8, the scale hook 12ᵇ may be temporarily uncoupled from the lever 8 and reconnected thereto after the lever 11 has been swung to the opposite positions stated.

What we claim is:

1. A brake-testing device comprising a plurality of pivotally connected members, certain of which have grapple-acting ends engageable with the exterior of a wheel tire and arranged to be drawn onto the tire by movement of one of the other of said members, and a scale applied to the latter noted member and to another of said other members and arranged to indicate the force exerted to rotate the wheel to which the device is applied.

2. A brake-testing device adapted for application to a vehicle wheel and comprising a primary lever, a secondary lever pivoted to the intermediate portion of said primary lever, grapple-acting bars pivoted to said primary lever at different points, and a scale applied between said primary and secondary levers and operative to indicate the force applied to said secondary lever in a direction to rotate the wheel said grapple-acting bars at their free ends being engageable with the exterior of a wheel tire to which the device is applied.

3. A brake-testing device adapted for application to a vehicle wheel and comprising a primary lever, a secondary lever pivoted to the intermediate portion of said primary lever, grapple-acting bars pivoted to said primary lever at different points, and a spring scale applied between said primary and secondary levers and serving to indicate force applied to said secondary lever in a direction to rotate the wheel said grapple-acting bars at their free ends being engageable with the exterior of a wheel tire to which the device is applied.

4. The structure defined in claim 3 in which one of said grapple-acting bars is adjustably pivoted to said primary lever.

5. The structure defined in claim 2 in which one of said grapple-acting bars is longer than the other, so that said primary lever will be at one side of a wheel hub when the grapple-acting ends of said bars are applied to a wheel at approximately diametrically opposite points.

In testimony whereof we affix our signatures.

JOHN J. RODEN.
PAUL W. QUINN.
DAVID C. RODEN.